United States Patent
Jin

(10) Patent No.: US 11,462,214 B2
(45) Date of Patent: Oct. 4, 2022

(54) ELECTRONIC APPARATUS AND CONTROL METHOD THEREOF

(71) Applicant: SAMSUNG ELECTRONICS CO., LTD., Suwon-si (KR)

(72) Inventor: Jangho Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/210,187

(22) Filed: Dec. 5, 2018

(65) Prior Publication Data
US 2019/0172460 A1 Jun. 6, 2019

(30) Foreign Application Priority Data
Dec. 6, 2017 (KR) .................. 10-2017-0166419

(51) Int. Cl.
*G10L 15/22* (2006.01)
*G10L 15/30* (2013.01)
*G10L 17/22* (2013.01)

(52) U.S. Cl.
CPC .............. *G10L 15/22* (2013.01); *G10L 15/30* (2013.01); *G10L 17/22* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 7,254,542 B2 * | 8/2007 | Dames | H04M 3/4938 704/270.1 |
| 7,788,340 B2 * | 8/2010 | Jolley | G06F 9/542 709/219 |
| 8,370,160 B2 * | 2/2013 | Pearce | H04L 67/02 704/270.1 |
| 9,082,408 B2 | 7/2015 | Koll et al. | |
| 9,679,563 B2 | 6/2017 | Lee et al. | |

(Continued)

FOREIGN PATENT DOCUMENTS

| | | |
|---|---|---|
| EP | 2 932 500 | 10/2015 |
| EP | 3 142 109 | 3/2017 |

(Continued)

OTHER PUBLICATIONS

International Search Report and Written Opinion of the International Searching Authority dated Mar. 15, 2019, issued in International Application No. PCT/KR2018/015397.

(Continued)

*Primary Examiner* — Fariba Sirjani
(74) *Attorney, Agent, or Firm* — Nixon & Vanderhye P.C.

(57) ABSTRACT

An electronic apparatus is provided. The electronic apparatus includes a communicator comprising communication circuitry configured to communicate with a voice recognition server; and a processor configured to control the communicator to establish a session with the voice recognition server, based on a voice input start signal being received from a first external apparatus, to maintain the established session based on the voice input start signal being received from a second external apparatus in a state where the session is established, and to process voice recognition on audio data received from the second external apparatus using the maintained session.

20 Claims, 11 Drawing Sheets

(56) References Cited

U.S. PATENT DOCUMENTS

| | | | |
|---|---|---|---|
| 10,236,016 B1* | 3/2019 | Li | H04R 1/00 |
| 10,397,372 B2* | 8/2019 | Narula | H04L 67/142 |
| 10,482,885 B1* | 11/2019 | Moniz | G06F 3/167 |
| 2005/0240404 A1* | 10/2005 | Gurram | G10L 15/32 |
| | | | 704/231 |
| 2009/0204410 A1* | 8/2009 | Mozer | G10L 15/30 |
| | | | 704/275 |
| 2012/0214448 A1* | 8/2012 | Othmer | H04M 1/6505 |
| | | | 455/412.1 |
| 2014/0163978 A1* | 6/2014 | Basye | G10L 15/28 |
| | | | 704/233 |
| 2014/0342670 A1* | 11/2014 | Kang | H04W 4/80 |
| | | | 455/67.11 |
| 2014/0359139 A1* | 12/2014 | Efrati | H04M 3/58 |
| | | | 709/227 |
| 2014/0365885 A1* | 12/2014 | Carson | G06F 16/3344 |
| | | | 715/708 |
| 2015/0243163 A1* | 8/2015 | Shoemake | H03M 13/09 |
| | | | 367/197 |
| 2015/0379992 A1* | 12/2015 | Lee | G06F 1/3287 |
| | | | 704/275 |
| 2016/0217792 A1* | 7/2016 | Gorodetski | G10L 17/04 |
| 2016/0240194 A1* | 8/2016 | Lee | G06F 1/3293 |
| 2017/0068724 A1* | 3/2017 | Bakshi | G10L 15/22 |
| 2017/0076724 A1 | 3/2017 | Park et al. | |
| 2017/0180486 A1* | 6/2017 | Mehta | H04L 67/142 |
| 2017/0251032 A1* | 8/2017 | Chappelle | H04M 3/42263 |
| 2017/0264939 A1* | 9/2017 | Jang | H04N 21/8405 |
| 2018/0158460 A1* | 6/2018 | Lee | G10L 15/22 |
| 2018/0182396 A1* | 6/2018 | An | G06F 40/35 |
| 2018/0204577 A1* | 7/2018 | DeMerchant | G10L 17/24 |
| 2018/0248823 A1* | 8/2018 | Wang | H04L 51/08 |
| 2018/0322868 A1* | 11/2018 | Retter | G10L 15/30 |
| 2019/0115029 A1* | 4/2019 | Kracun | G10L 15/22 |
| 2019/0311721 A1* | 10/2019 | Edwards | G10L 17/06 |

FOREIGN PATENT DOCUMENTS

| | | |
|---|---|---|
| JP | 2016-506183 | 2/2016 |
| JP | 6131248 | 5/2017 |
| JP | 6193800 | 9/2017 |
| KR | 10-0553557 | 2/2006 |
| KR | 10-2016-0001964 | 1/2016 |
| KR | 10-2017-0032114 | 3/2017 |
| WO | 2012/074643 | 6/2012 |
| WO | 2014/093238 | 6/2014 |
| WO | 2014/105052 | 7/2014 |

OTHER PUBLICATIONS

Extended European Search Report dated Apr. 26, 2019 issued in European Patent Application No. 18210536.1.
India Examination Report dated Apr. 26, 2022 for IN Application No. 202017021466.

\* cited by examiner

FIG. 7
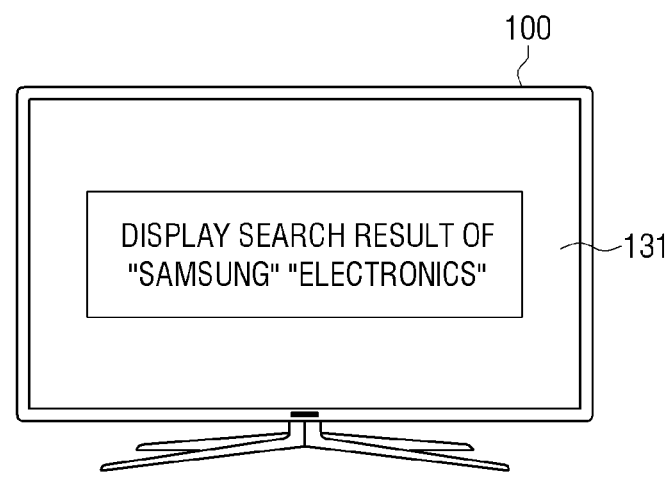
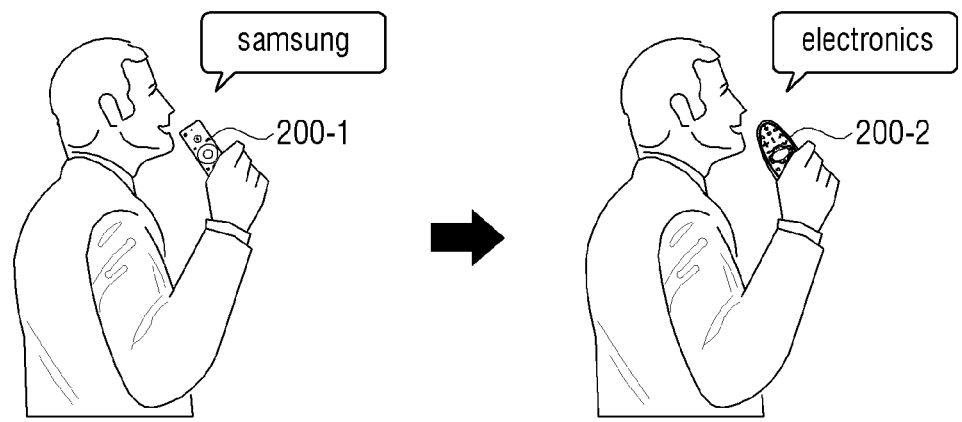

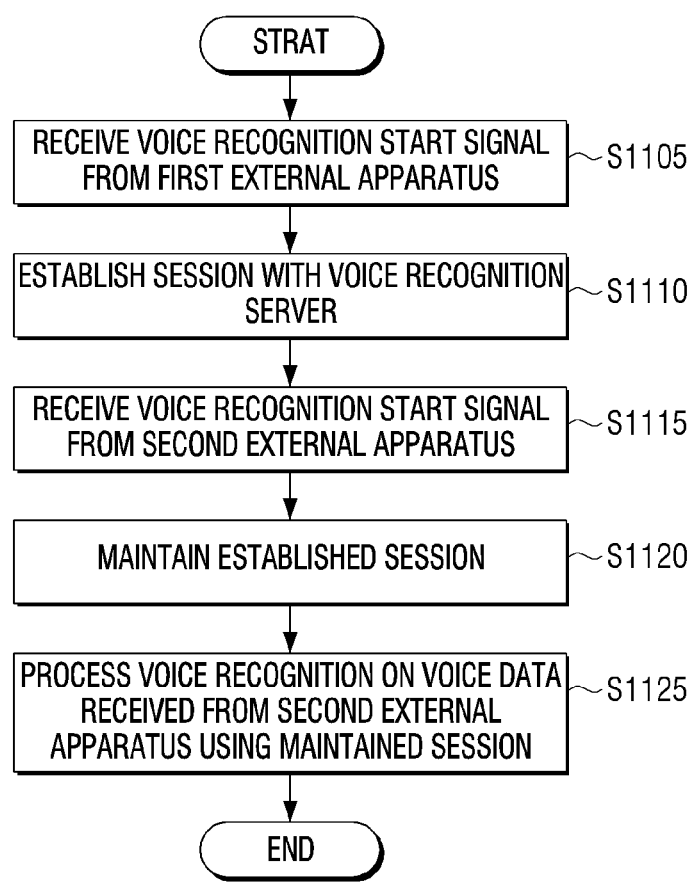

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2017-0166419, filed on Dec. 6, 2017, in the Korean Intellectual Property Office, the disclosure of which is incorporated by reference herein in its entirety.

BACKGROUND

Field

The present disclosure relates generally to an electronic apparatus and a control method thereof, and, for example, to an electronic apparatus in which an external apparatus communicating with the electronic apparatus maintains an established session with a server and a control method thereof.

Description of Related Art

An electronic apparatus that receives audio data and transmits the audio data to a voice recognition server may establish a session with the server. The electronic apparatus may use an external apparatus to receive the audio data. Here, in the case of a switching operation in which the external apparatus that receives the audio data is changed to another external apparatus, the existing session is blocked and a new session is connected.

That is, in the related art, in the case of a switching operation of attempting to recognize another external apparatus while receiving the audio data using the external apparatus, a session with the existing server is blocked and a new session is established. In this process, unnecessary processing time and waste of traffic for connecting the server occur.

SUMMARY

Example embodiments of the present disclosure address the above disadvantages and other disadvantages not described above.

The present disclosure provides an electronic apparatus that maintains an established session with an existing server based on an external apparatus communicating with the electronic apparatus being changed and a control method thereof.

According to an example aspect of the present disclosure, an electronic apparatus includes a communicator comprising communication circuitry configured to communicate with a voice recognition server; and a processor configured to control the communicator to establish a session with the voice recognition server based on a voice input start signal being received from a first external apparatus, to maintain the established session, and to process voice recognition on audio data received from the second external apparatus using the maintained session.

The processor may be configured to determine whether a user of the first external apparatus and a user of the second external apparatus are the same user, to maintain the established session based on the user of the first external apparatus and the user of the second external apparatus being the same user, to block the established session and establish a new session based on the user of the first external apparatus and the user of the second external apparatus being not the same user.

The processor may be configured to determine whether the user of the first external apparatus and the user of the second external apparatus are the same user by comparing a voice of first audio data received from the first external apparatus with a voice of second audio data received from the second external apparatus.

The processor may be configured to determine whether the user of the first external apparatus and the user of the second external apparatus are the same user by comparing ID information of the first external apparatus with ID information of the second external apparatus.

The processor may be configured to establish a session using information about voice recognition of the electronic apparatus, to maintain the information about voice recognition based on the voice input start signal being received from the second external apparatus, and to maintain the established session.

The information about voice recognition may include at least one of: usage terms and conditions, account information, a network status, a voice recognition parameter, and a voice recognition command list.

The voice recognition parameter may include at least one of: currently input source information and an apparatus state. The voice recognition command list may include at least one of: application information used in the electronic apparatus, EPG data of a currently input source, and a command for a function provided by the electronic apparatus.

The electronic apparatus may further include a memory configured to store first audio data received from the first external apparatus, wherein the processor is configured to transmit the first audio data to the voice recognition server using the established session, and to combine and transmit second audio data received from the second external apparatus with the stored first audio data to the voice recognition server.

The electronic apparatus may further include a display, wherein the processor is configured to control the display to display information about a progress of voice recognition based on the voice input start signal being received from the first external apparatus.

According to another example aspect of the present disclosure, a control method of an electronic apparatus includes receiving a voice input start signal from a first external apparatus; establishing a session with a voice recognition server; receiving the voice input start signal from a second external apparatus in a state where the session is established; maintaining the established session; and processing voice recognition on audio data received from the second external apparatus using the maintained session.

The control method may further include determining whether to maintain the established session before maintaining the established session, determining whether a user of the first external apparatus and a user of the second external apparatus are the same user, maintaining the established session based on the user of the first external apparatus and the user of the second external apparatus being the same user, blocking the established session and establishing a new session based on the user of the first external apparatus and the user of the second external apparatus being not the same user.

The determining of whether to maintain the established session may include determining whether the user of the first external apparatus and the user of the second external apparatus are the same user by comparing a voice of first audio data received from the first external apparatus with a voice of second audio data received from the second external apparatus.

The determining of whether to maintain the established session may include determining whether the user of the first external apparatus and the user of the second external apparatus are the same user by comparing ID information of the first external apparatus with ID information of the second external apparatus.

The establishing of the session with the voice recognition server may include establishing a session using information about voice recognition of the electronic apparatus, and wherein the maintaining of the established session includes maintaining the information about voice recognition based on the voice input start signal being received from the second external apparatus, and maintaining the established session.

The information about voice recognition may include at least one of: usage terms and conditions, account information, a network status, a voice recognition parameter, and a voice recognition command list.

The voice recognition parameter may include at least one of: currently input source information and an apparatus state.

The voice recognition command list may include at least one of: application information used in the electronic apparatus, EPG data of a currently input source, and a command for a function provided by the electronic apparatus.

The control method may further include storing first audio data received from the first external apparatus; transmitting the first audio data to the voice recognition server using the established session; and combining and transmitting second audio data received from the second external apparatus with the stored first audio data to the voice recognition server.

The control method may further include displaying information about a progress of voice recognition based on the voice input start signal being received from the first external apparatus.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 7 is a diagram illustrating an example switching process according to an example embodiment of the present disclosure;

FIG. 11 is a flowchart illustrating an example method of controlling an electronic apparatus according to an example embodiment of the present disclosure.

DETAILED DESCRIPTION

Figure 1:
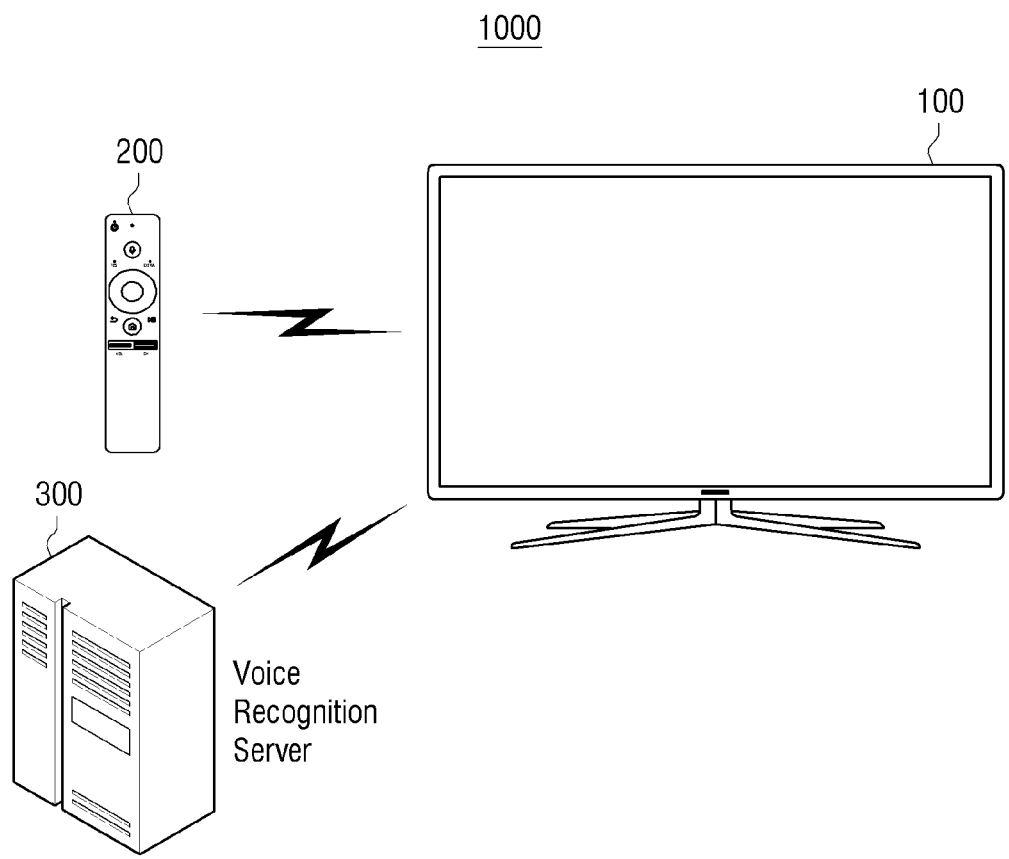
FIG. 1 is a diagram illustrating an example voice recognition system according to an example embodiment of the present disclosure.

Before describing the present disclosure in detail, a method of describing the present disclosure and the drawings will be provided.

Although general terms used in the present disclosure and claims are provided to describe example embodiments in consideration of the functions thereof, these general terms may vary according to intentions of one of ordinary skill in the art, legal or technical interpretation, the advent of new technologies, and the like. Some terms may be arbitrarily selected. These terms may be understood as having a meaning defined herein and, unless otherwise specified, may be understood based on the entire contents of the present disclosure and common technical knowledge in the art.

Also, the same reference numerals or symbols as used in the accompanying drawings denote parts or components performing substantially the same function. For ease of explanation and understanding, different embodiments will be described using the same reference numerals or symbols. In other words, even though all the components having the same reference numerals are shown in the plural drawings, the plural drawings do not necessarily refer to one embodiment.

Also, in the present disclosure and the claims, terms including ordinal numbers such as "first", "second", etc. may be used for distinguishing between components. These ordinals are used to distinguish between identical or similar components, and the use of such ordinals should not be understood as limiting the meaning of the term. For example, components associated with such ordinal numbers should not be limited in their use order or arrangement order by their numbers. If necessary, each ordinal number may be used interchangeably.

As used herein, the singular forms "a", "an" and "the" include plural referents unless the context clearly dictates otherwise. In the present disclosure, the terms "include" or "configured" and the like, specify the presence of a feature, a number, a step, an operation, a component, parts, or a combination thereof but do not preclude the presence or addition of one or more features, numbers, steps, operations, components, parts, or combinations thereof.

As the disclosure allows for various changes and numerous example embodiments, example embodiments will be illustrated in the drawings and described in greater detail in the disclosure. However, this is not intended to limit the present disclosure to any particular mode of practice, and it is to be appreciated that all changes, equivalents, and substitutes that do not depart from the spirit and technical scope of the present disclosure are encompassed in the present disclosure. In the description of the present disclosure, certain detailed explanations of the related art may be omitted when it is deemed that they may unnecessarily obscure the essence of the disclosure.

While such terms as "first," "second," etc., may be used to describe various components, such components must not be limited to the above terms. The above terms are used only to distinguish one component from another.

In the embodiments of the present disclosure, the terms such as "module," "unit," "part," and the like are terms for designating a component that performs at least one function or operation. The component may be implemented as hardware, software, or any combination of hardware and software. A plurality of "modules", "units", "parts", etc. may be integrated into at least one module or chip and implemented as at least one processor, excluding the case where each is necessarily implemented as individual specific hardware.

Further, in the various example embodiments of the present disclosure, when a part is connected to another part, this includes not only a direct connection but also an indirect connection through another medium or component. Also, the meaning that a part includes a component does not exclude other elements, but may include other components, unless specifically stated otherwise.

FIG. 1 is a diagram illustrating an example voice recognition system according to an example embodiment of the present disclosure.

Referring to FIG. 1, a voice recognition system 1000 may include an electronic apparatus 100, an external apparatus 200, and a voice recognition server 300.

The electronic apparatus 100 may be implemented as various devices such as, for example, and without limitation, a computer, a TV, a set-top box, a smart phone, a smart watch, or the like. For example, the electronic apparatus 100 may be implemented, for example, and without limitation, as an analog TV, a digital TV, a 3D TV, a smart TV, an LED TV, an OLED TV, a plasma TV, a monitor, a curved TV having a screen with a fixed curvature, a flexible TV having a screen with a fixed curvature, a bended TV having a screen with a fixed curvature, and/or a curvature-variable TV capable of changing a curvature of a current screen according to a received user input, or the like, but is not limited thereto.

The electronic apparatus 100 according to another example embodiment of the present disclosure may receive voice through, for example, and without limitation, an embedded microphone, a microphone embedded in an external apparatus, or the like, and may perform direct voice recognition.

When the electronic apparatus 100 directly performs voice recognition, an artificial intelligence system for recognizing voice may be provided. The artificial intelligence system may refer, for example, to a computer system that implements intelligence, e.g., human-level intelligence, and may be a system in which machine learns and determines for itself and a recognition rate improves as it is used. Among the artificial intelligence technologies, voice input through the linguistic understanding technology which recognizes the human language/characters may be used. Linguistic understanding may refer, for example, to a technology for recognizing and applying/processing human language/characters and may include, for example, and without limitation, natural language processing, machine translation, dialogue system, query response, voice recognition/synthesis, and the like.

According to another example embodiment of the present disclosure, a separate external apparatus with an embedded microphone may be present, and the external apparatus may perform voice recognition processing on the input voice to provide a voice recognition result to the electronic apparatus 100.

The electronic apparatus 100 may be controlled based on the voice recognition result. For example, if the voice recognition result includes "recommend a channel", a preferred channel may be selected and information about the selected preferred channel may be provided through an output unit 130 (see, e.g., FIG. 3). In this case, the channel may, for example, be a specific program or a specific content.

The external apparatus 200 may, for example, be a remote controller capable of controlling the electronic apparatus 100, and may, for example, and without limitation, include a smart phone such as a mobile device, a wearable device, or the like. For example, a user may transmit audio data to the electronic apparatus 100 through a microphone embedded in the smart phone.

The external apparatus 200 may transmit a voice input start signal to the electronic apparatus 100. In this case, the electronic apparatus 100 and the external apparatus 200 may communicate using any of various communication methods including, for example, and without limitation, a Bluetooth method. The electronic apparatus 100 may again receive audio data from the external apparatus 200 and transmit the audio data to the voice recognition server 300. The voice recognition server 300 may analyze the transmitted audio data and transmit a result of voice recognition to the electronic apparatus 100.

Although it has been described that the user establishes a session with the voice recognition server 300 for a voice recognition process, the electronic apparatus 100 may process voice recognition by itself.

Figure 2:
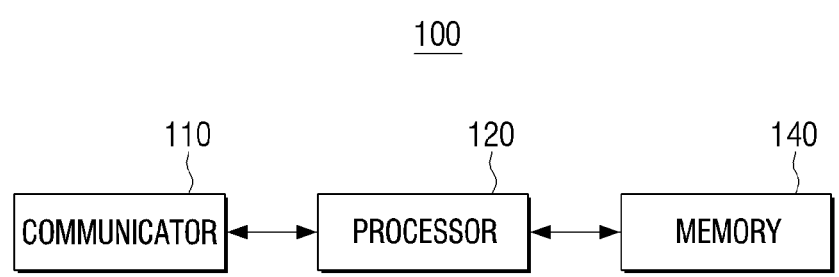
FIG. 2 is a block diagram illustrating an example electronic apparatus according to an example embodiment of the present disclosure.

FIG. 2 is a block diagram illustrating an example electronic apparatus according to an example embodiment of the present disclosure.

Referring to FIG. 2, the electronic apparatus 100 may include a communicator (e.g., including communication circuitry) 110, a processor (e.g., including processing circuitry) 120, and a memory 140.

The communicator 110 may include various communication circuitry and perform communication with various types of external devices according to various types of communication methods.

The communicator 110 may communicate with the electronic apparatus 100 and the external apparatus 200. The communicator 110 may establish a session with the electronic apparatus 100 and the voice recognition server 300.

The communicator 110 may be connected to an external device through a local area network (LAN) or an Internet network and may be connected to the external device through, for example, and without limitation, wireless communication (e.g., Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, etc.). The communicator 110 may include various communication chips including various communication circuitry, such as, for example, and without limitation, a Wi-Fi chip, a Bluetooth chip, an NFC chip, a wireless communication chip, or the like. The Wi-Fi chip, the Bluetooth chip and the NFC chip may communicate using a WiFi method, a Bluetooth method and an NFC method, respectively. The wireless communication chip may refer, for example, to a chip including communication circuitry that performs communication according to various communication standards such as IEEE, ZigBee, 3rd Generation (3G), 3rd Generation Partnership Project (3GPP), Long Term Evolution (LTE), or the like. The communicator 110 may include an optical receiving unit including optical receiving circuitry capable of receiving a control signal (e.g., an IR pulse) from an external apparatus. The communicator 110 may receive a user command input in the external apparatus through the communicator 110.

The processor 120 may include various processing circuitry and control the overall operation of the electronic apparatus 100 and a signal flow between the internal components of the electronic apparatus 100 and perform a function of processing data.

The processor 120 may control the communicator 110 to establish a session with the voice recognition server 300 when a voice input start signal is received from a first external apparatus 200-1 (see, e.g., FIG. 7), maintain the established session when the voice input start signal is received from a second external apparatus 200-2 (see, e.g., FIG. 7) in a state where the session is established and process voice recognition on audio data received from the second external apparatus 200-2 using the maintained session.

Here, the processor 120 may determine whether a user of the first external apparatus 200-1 and a user of the second external apparatus 200-2 are the same user, maintain the established session when the user of the first external apparatus 200-1 and the user of the second external apparatus 200-2 are the same user, block the established session and establish a new session when the user of the first external apparatus 200-1 and the user of the second external apparatus 200-2 are not the same user.

On the other hand, the processor 120 may compare voice of first audio data received from the first external apparatus 200-1 and voice of second audio data received from the second external apparatus 200-2 to determine whether the user of the first external apparatus 200-1 and the user of the second external apparatus 200-2 are the same user.

The processor 120 may also compare ID information of the first external apparatus 200-1 with ID information of the second external apparatus 200-2 to determine whether the user of the first external apparatus 200-1 and the user of the second external apparatus 200-2 are the same user.

On the other hand, the processor 120 may establish the session using information about voice recognition of the electronic apparatus 100, and when the voice input start signal is received from the second external apparatus 200-2, maintain the information about voice recognition to maintain the established session.

The information about voice recognition may include, for example, and without limitation, at least one of: usage terms and conditions, account information, a network status, a voice recognition parameter, and a voice recognition command list.

The voice recognition parameter may include, for example, and without limitation, at least one of: currently input source information and an apparatus status. The voice recognition command list may include, for example, and without limitation, at least one of: application information used in the electronic apparatus 100, EPG data of a currently input source, and commands for functions provided by the electronic apparatus 100. The electronic apparatus 100 may maintain information about an existing session as it is, and thus stability of the session may be ensured.

The processor 120 may transmit the first audio data to the voice recognition server 300 using the established session and combine second audio data received from the second external apparatus 200-2 with the stored first audio data to transmit the combined data to the voice recognition server 300.

The electronic apparatus 100 may further include a display, and the processor 120 may control the display to display information about a progress of voice recognition when the voice input start signal is received from the first external apparatus 200-1.

When the electronic apparatus 100 is connected to a separate display apparatus, the processor 120 may transmit to the separate display apparatus a signal for controlling the display apparatus to display the information about the progress of voice recognition. This will be described in greater detail below with reference to FIG. 3.

The memory 140 may store data processed in the electronic apparatus 100. For example, the memory 140 may store audio data received from the external apparatus 200. The memory 140 may store contents of a voice recognition result received from the voice recognition server 300. The memory 140 may store the first audio data received from the first external apparatus 200-1.

The memory 140 may be implemented, for example, and without limitation, as a non-volatile memory, a volatile memory, a flash memory, a hard disk drive (HDD), a solid state drive (SSD), or the like. The memory 140 may be implemented, for example, and without limitation, as an external storage medium such as a micro SD card, a USB memory or a web server over a network as well as a storage medium in the electronic apparatus 100.

The electronic apparatus 100 according to an example embodiment of the present disclosure may directly perform a STT (Speech To Text) function. The electronic apparatus 100 may convert a digital voice signal to text information and transmit the converted text information to the voice recognition server 300. In this case, the voice recognition server 300 may perform only a search function. The voice recognition server 300 may, for example, search for information corresponding to the converted text information and transmit the information to the electronic apparatus 100.

The electronic apparatus 100 according to another example embodiment of the present disclosure may transmit the received digital voice signal to the voice recognition server 300. The voice recognition server 300 may perform a STT (Speech To Text) function for converting the digital voice signal into the text information. The voice recognition server 300 may perform the STT function to convert the digital voice signal into the text information and search for the information corresponding to the converted text information. The voice recognition server 300 may transmit the information corresponding to the converted text information to the electronic apparatus 100. The voice recognition server 300 described above may simultaneously perform the STT (Speech To Text) function and the search function.

The voice recognition server 300 may perform only the STT (Speech To Text) function whereas a separate server may perform the search function. In this case, the server performing the STT (Speech To Text) function may convert the digital voice signal into the text information and transmit the converted text information to the separate server performing the search function. The electronic apparatus 100 according to an example embodiment of the present disclosure may maintain an established session using information about the existing established session without establishing a new session in the case of a switching operation, and thus an unnecessary processing time and traffic for a server connection may not be wasted.

Although only a simplified example configuration of the communicator 110, the processor 120, and the memory 140 has been illustrated and described above, various configurations may be additionally provided when implemented. This will be described in greater detail below with reference to FIG. 3.

Figure 3:
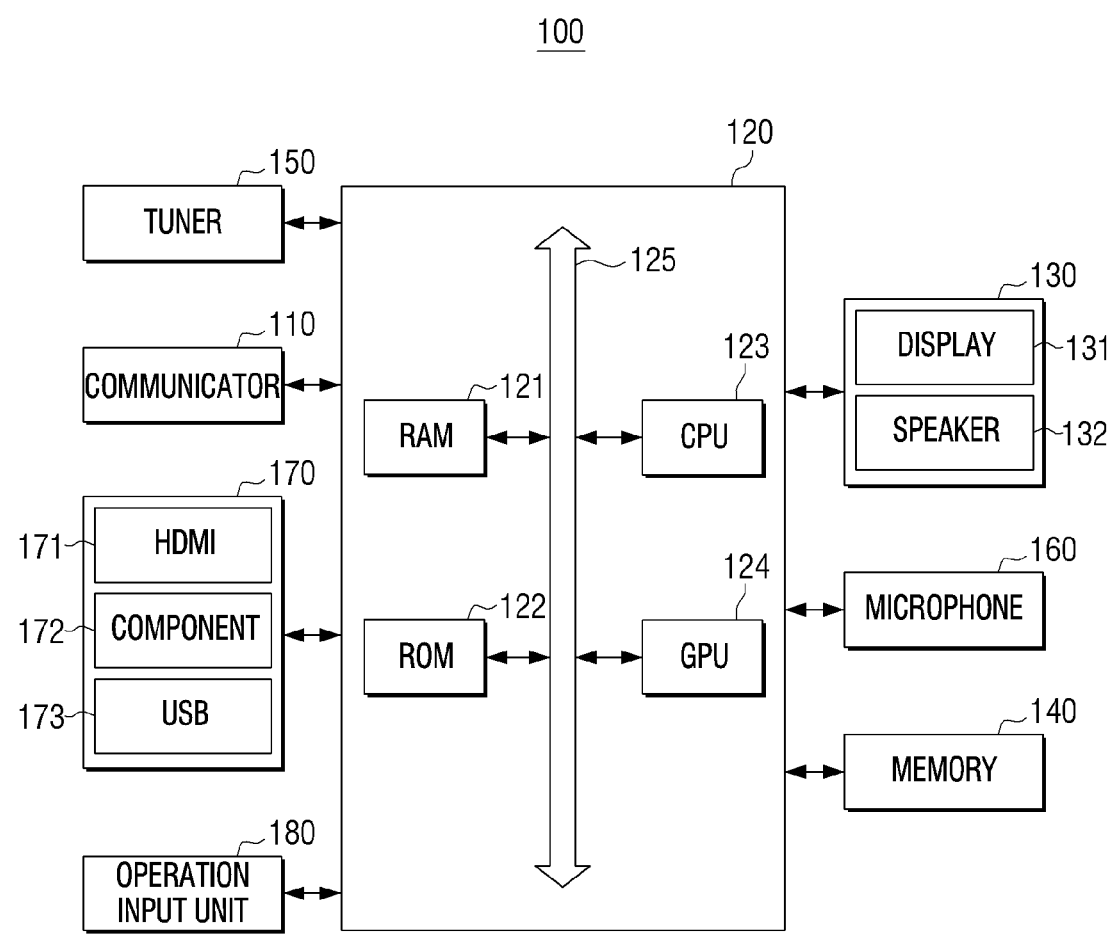
FIG. 3 is a block diagram illustrating an example configuration of the electronic apparatus of FIG. 2.

FIG. 3 is a block diagram illustrating an example configuration of an electronic apparatus of FIG. 2.

Referring to FIG. 3, the electronic apparatus 100 may include the communicator (e.g., including communication circuitry) 110, the processor (e.g., including processing circuitry) 120, the output unit (e.g., including output circuitry) 130, the memory 140, a tuner (e.g., including tuning circuitry) 150, a microphone 160, a port unit (e.g., including various connection ports) 170, and an operation input unit (e.g., including input circuitry) 180.

Operations of the communicator 110 and the memory 140 have been described above with reference to FIG. 2, and thus redundant descriptions thereof will not be repeated here.

The processor 120 may include, for example, a RAM 121, a ROM 122, a CPU 123, a GPU 124 and a bus 125. The RAM 121, the ROM 122, the CPU 123, the GPU 124, and the like may be connected to each other via the bus 125. The processor 120 may be implemented as a SoC (System On Chip).

The GPU 124 of the processor 120 may analyze an image and the CPU 123 may control the overall operation.

The CPU 123 may access the memory 140 and perform booting using an O/S stored in the memory 140. The CPU 123 may perform various operations using various programs, contents, data, etc. stored in the memory 140. The CPU 123 may perform operations of the processor 120 described with respect to FIG. 1.

When the electronic apparatus 100 is completely booted, the GPU 124 may generate a screen including various objects such as an icon, an image, a text, and the like. Such a GPU configuration may be configured as a separate configuration such as an image processing unit, or may be implemented as a configuration such as SoC combined with the CPU 123 in the processor 120.

The ROM 122 may store a command set for booting the system and the like. When a turn-on command is input and power is supplied, the CPU 123 may copy the O/S stored in the memory 140 to the RAM 121 according to the command stored in the ROM 122, execute the O/S, and boot the system. When booting is completed, the CPU 123 may copy various application programs stored in the memory 140 to the RAM 121, execute the application programs copied to the RAM 121, and perform various operations. The processor 120 may perform various operations using modules stored in the memory 140.

The output unit 130 may include various output circuitry, such as, for example, and without limitation, a display 131 for outputting an image, a speaker 132 for outputting audio, or the like.

The display 131 may display an image such that a user may view preferred content provided by the processor 120. Also, the display 131 may additionally display an UI element to the user while displaying the image. In this case, the UI element may refer, for example, to a phrase requesting selection to the user, and may include a menu displaying a plurality of preferred contents. The UI element may be an interface that is not limited to any specific content, but may be recognized separately from the content.

The display 131 may be implemented, for example, and without limitation, as a liquid crystal display (LCD), a plasma display panel (PDP), an organic light emitting diode (OLED), or the like and may be implemented as a touch screen.

The display 131 may be a component included in electronic apparatus 100. The processor 120 may control the display 131 to display information about a progress of voice recognition on the display 131 included in the electronic apparatus 100.

The electronic apparatus 100 according to another example embodiment of the present disclosure may be connected to a separate display apparatus without including a display. In this case, the processor 120 may control the communicator 110 to transmit video and audio signals to the separate display apparatus.

The processor 120 may control the communicator 110 to transmit a control signal for displaying information about the progress of voice recognition to the display apparatus when a voice input start signal is received from the external apparatus 200.

The electronic apparatus 100 according to another example embodiment of the present disclosure may be connected to a separate display apparatus without including the display 131. In this case, the display apparatus may be connected to the electronic apparatus 100 to receive video and audio signals. The display apparatus may include a display and an audio output unit to receive and output the video and audio signals. The audio output unit may include various output circuitry including, for example, and without limitation, a speaker, a headphone output terminal, an S/PDIF output terminal, or the like, for outputting audio data.

In this case, the electronic apparatus 100 may include an output port included in, for example, a port unit 170, for transmitting the video and audio signals to the display apparatus. Here, the output port of the electronic apparatus 100 may be a port capable of simultaneously transmitting the video and audio signals. For example, the output port may be an interface among, for example, and without limitation, a High Definition Multimedia Interface (HDMI), a Display Port (DP), a Thunderbolt, or the like.

The output port of the electronic apparatus 100 may be configured as separate ports to transmit the video and audio signals, respectively.

The electronic apparatus 100 may utilize a wireless communication module including various communication circuitry to communicate the video and audio signals to the display apparatus. The wireless communication module may be a module connected to an external network to perform communication according to a wireless communication protocol such as, for example, and without limitation, WiFi, IEEE, or the like. In addition, the wireless communication module may further include a mobile communication module including various communication circuitry that accesses a mobile communication network and performs communication according to various mobile communication standards such as, for example, and without limitation, 3G (3rd Generation), 3rd Generation Partnership Project (3GPP), LTE (Long Term Evolution), LTE-A (LTE Advanced), or the like.

The speaker 132 may be provided to output audio. The speaker 132 may be an acoustical device for converting an electric signal into a vibration of a diaphragm to generate a small-sized wave in air to copy sound waves, and may output voice data.

The memory 140 may be implemented, for example, and without limitation, as a non-volatile memory, a volatile memory, a flash memory, a hard disk drive (HDD), a solid state drive (SSD), or the like. The memory 140 may be implemented as an external storage medium such as, for example, and without limitation, a micro SD card, a USB memory, a web server over a network, or the like, as well as a storage medium in the electronic apparatus 100.

The tuner 150 may include various tuning circuitry and receive video, audio, and data in a frequency band corresponding to a channel number corresponding to a user input.

The tuner 150 may receive broadcast signals from various sources such as terrestrial broadcast, cable broadcast, satellite broadcast, or the like. The tuner 150 may receive broadcast signals from sources such as analog broadcast or digital broadcast from various sources.

The tuner 150 may be implemented as, for example, and without limitation, an all-in-one with the electronic apparatus 100 or a separate apparatus (e.g., a set-top box, a tuner connected to the port unit 170) having a tuner unit electrically connected to the electronic apparatus 100.

The tuner 150 may tune and select only a frequency of a channel to be received by the electronic apparatus 100 among many wave components through amplification, mixing, and resonance of a broadcast signal received by wired or wirelessly. The broadcast signal may include video, audio, and additional data (e.g., an EPG (Electronic Program Guide).

The microphone 160 may receive voice to directly perform voice recognition or transmit voice input to an external server that performs voice recognition to receive a voice recognition result. The microphone 160 may receive a sound signal as well as human voice. The microphone 160 may receive the transmitted sound signal and receive a sound signal in an audible region as well as a sound signal in a non-audible region.

The microphone 160 may convert information about the received sound into an electrical signal.

The microphone 160 may include various configurations of circuitry such as, for example, and without limitation, a microphone for collecting user's voice in analog form, an amplifier circuit for amplifying the collected user's voice, an A/D conversion circuit for sampling the amplified user's voice and converting the sampled user's voice into a digital signal, a filter circuit for removing a noise component from the converted digital signal, or the like.

The port unit 170 is a configuration including various ports to be connected to the external apparatus 200. The port unit 170 may include, for example, and without limitation, at least one of a High-Definition Multimedia Interface (HDMI) port 171, a component input jack 172, a USB port 173, or the like. The port unit 170 may include, for example, and without limitation, at least one of ports of RGB, DVI, HDMI, DP, Thunderbolt, and the like. Information about a recommendation service may be transmitted to the external apparatus 200 through the port unit 170.

The operation input unit 180 may include various input circuitry and receive a selection of the user of preferred content displayed on the display 131. The operation input unit 180 may be implemented as an apparatus including various input circuitry, such as, for example, and without limitation, a button, a touch pad, a mouse and a keyboard, a touch screen capable of performing the above-described display function and an operation input function, or the like.

Figure 4:
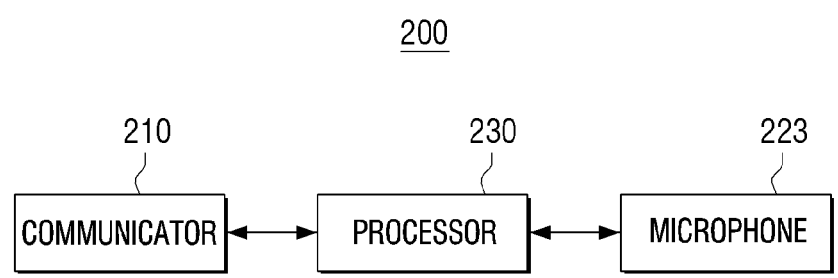
FIG. 4 is a block diagram illustrating an example external apparatus according to an example embodiment of the present disclosure.

FIG. 4 is a block diagram illustrating an example external apparatus according to an example embodiment of the present disclosure.

Referring to FIG. 4, the external apparatus 200 may include a communicator (e.g., including communication circuitry) 210, a microphone 223, and a processor (e.g., including processing circuitry) 230.

The external apparatus 200 may be a control apparatus capable of communicating with an electronic apparatus. For example, the external apparatus 200 may establish a wireless connection with the electronic apparatus using, for example, and without limitation, a Bluetooth method.

The communicator 210 may include various communication circuitry and transmit a voice input start signal to the electronic apparatus 100. Further, the communicator 210 may receive a microphone input start signal from the electronic apparatus 100. The communicator 210 may transmit audio data of a user received via the microphone 223 to the electronic apparatus 100.

Figure 5:
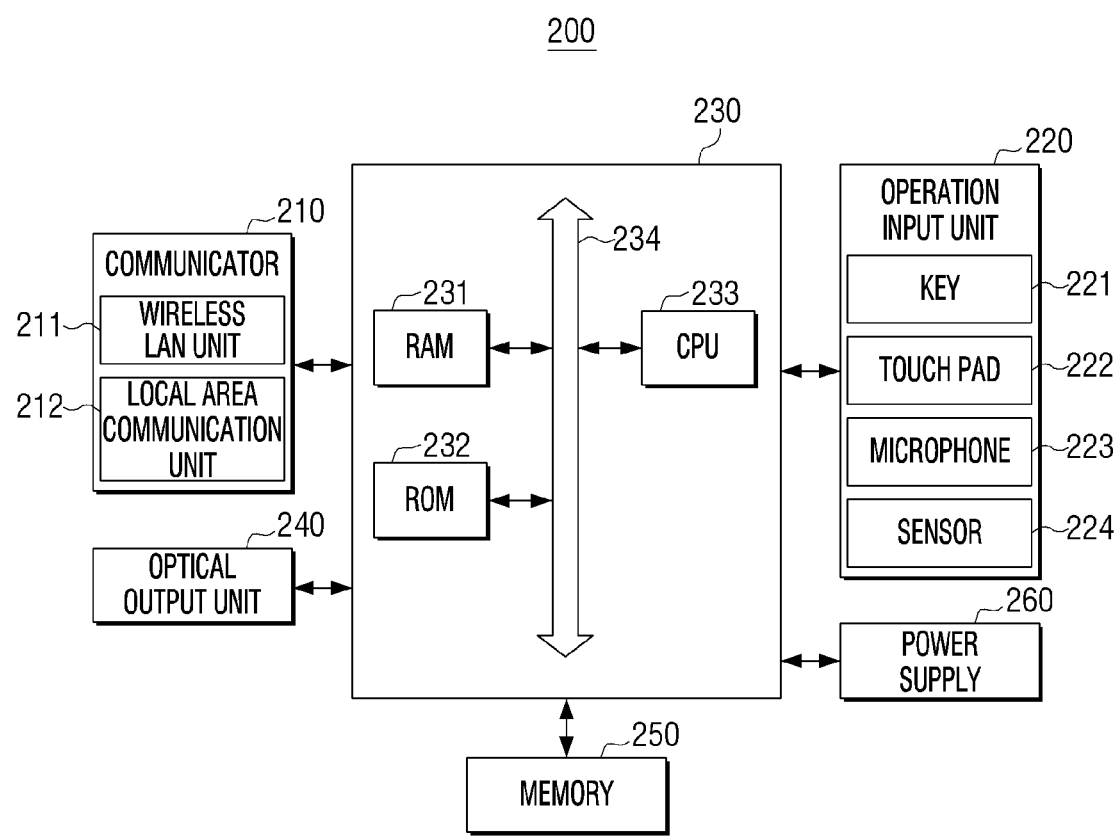
FIG. 5 is a block diagram illustrating an example configuration of the external apparatus of FIG. 4.

The communicator 210 may include various communication circuitry, such as, for example, and without limitation, at least one of a wireless LAN unit 211 and a local area communication unit 212 (see, e.g., FIG. 5). For example, the communicator 210 may include one of the wireless LAN unit 211 and the local area communication unit 212, or both the wireless LAN unit 211 and local area communication unit 212.

The wireless LAN unit 211 may include various communication circuitry and be connected to an access point (AP) wirelessly in a place where the AP is installed, under the control of a control unit. The wireless LAN unit 211 may, for example, support the IEEE 802.11x standard of the Institute of Electrical and Electronics Engineers (IEEE). Further, the local area communication unit 212 may include various communication circuitry and perform near field communication between a portable device and the external apparatus wirelessly without the AP according to the control of the control unit. Local area communication may include, for example, and without limitation, Bluetooth, Bluetooth low energy, infrared data association (IrDA), Wi-Fi, Ultra Wideband (UWB), Near Field Communication (NFC) and the like.

The communicator 210 is a configuration including circuitry to perform communication with various types of external devices according to various types of communication methods. The communicator 210 may be connected to an external apparatus through a local area network (LAN) or an Internet network and may be connected to the external device through wireless communication (e.g., Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, etc.). The communicator 210 may include various communication chips including various communication circuitry, such as, for example, and without limitation, a Wi-Fi chip, a Bluetooth chip, an NFC chip, a wireless communication chip, or the like. The Wi-Fi chip, the Bluetooth chip and the NFC chip may, for example, communicate using a WiFi method, a Bluetooth method and an NFC method, respectively.

The Wi-Fi chip and the Bluetooth chip communicate with each other using the WiFi method and the Bluetooth method, respectively. When the Wi-Fi chip or the Bluetooth chip is used, the communicator 210 may first transmit and receive various kinds of connection information such as an SSID, a session key, etc., and perform communication connection using the various kinds of connection information to transmit and receive various kinds of information.

The microphone 223 may receive voice. Also, the microphone 223 may receive specific sound as well as voice. The microphone 223 may receive the specific sound transmitted from the electronic apparatus 100. The specific sound may be sound of an audible region as well as sound of a non-audible region. Based on the sound sensed by the microphone 223, the processor 230 may calculate (determine) a distance between the external apparatus 200 and the electronic apparatus 100 that outputs the sound, and a specific operation will be described in greater detail below.

The microphone 223 may convert data of the received sound into an electric signal.

The microphone 223 may include various configurations and circuitry, such as, for example, and without limitation, a microphone for collecting user's voice in analog form, an amplifier circuit for amplifying the collected user's voice, an A/D conversion circuit for sampling the amplified user's voice and converting the sampled user's voice into a digital signal, a filter circuit for removing a noise component from the converted digital signal, or the like.

The processor 230 may include various processing circuitry and control the overall operation of the external apparatus 200. For example, the processor 230 may determine the electronic apparatuses 100 that are connectable to the external apparatus 200.

While only a simplified example configuration of the external apparatus 200 has been shown and described above, various configurations may be additionally provided when implemented. An example of this will be described in greater detail below with reference to FIG. 5.

FIG. 5 is a block diagram illustrating an example configuration of an external apparatus of FIG. 4.

Referring to FIG. 5, the external apparatus 200 for controlling the electronic apparatus 100 may include the communicator (e.g., including communication circuitry) 210, the operation input unit (e.g., including input circuitry) 220, the processor (e.g., including processing circuitry) 230, an optical output unit (e.g., including optical output circuitry) 240, a memory 250, and a power supply 260.

Operations of the communicator 210 and the microphone 223 of the operation input unit 220 have been described above with reference to FIG. 4, and redundant descriptions thereof will not be repeated here.

The operation input unit 220 may include various input circuitry, such as, for example, and without limitation, a key 221, a touch pad 222, a microphone 223, a sensor 224, and the like.

The key 221 may be a physical configuration for receiving a user input, and may be a number of function keys that may be set or selected by a user.

The touch pad 222 may be a physical component that receives the user input and correspond to a pointing device that is a replacement for a mouse. The touch pad 222 may be implemented as an apparatus that simultaneously implements input and output such as a touch screen or the like.

The sensor 224 may include at least one sensor and measure a physical quantity or sense an operating state of the external apparatus 200 to convert measured or sensed data into electrical signals. The sensor 224 may include various sensors (e.g., a motion sensor, a gyro sensor, an acceleration sensor, a gravity sensor, etc.) for detecting motion.

The operation input unit 220 may output a signal (e.g., an analog signal or a digital signal) corresponding to the received user input (e.g., touch, press, touch gesture, voice, or motion) to a control unit.

The processor 230 may include a RAM 231, a ROM 232, a CPU 233 and a bus 234. The RAM 231, the ROM 232, the CPU 233, and the like may be connected to each other via the bus 234. The processor 230 may be implemented as a SoC (System On Chip).

The RAM 231 may copy and temporarily store data necessary for various operations performed by the processor 230 and may transmit the temporarily stored data to the processor 230 again.

The ROM 232 may store a command set for booting the system and the like. When a turn-on command is input and power is supplied, the CPU 233 may copy the O/S stored in the memory 250 to the RAM 231 according to the command stored in the ROM 243, execute the O/S, and boot the system. When booting is completed, the CPU 233 may copy various application programs stored in the memory 250 to the RAM 231, execute the application programs copied to the RAM 231, and perform various operations. The processor 230 may perform various operations using modules stored in the memory 250.

The CPU 233 may access the memory 250 and perform booting using the O/S stored in the memory 250. The CPU 233 may perform the operations of the processor 230 described with reference to FIG. 1.

The optical output unit 240 may include various circuitry and output an optical signal (e.g. including a control signal) corresponding to the received user input (e.g., touch, press, touch gesture, voice, or motion) under control of the control unit to an optical receiving unit of the electronic apparatus 100. A remote control code format used in the external apparatus 200 may, for example, be one of a manufacturer's remote control code format and a commercially available remote control code format. The remote control code format may include a leader code and a data word. The output optical signal may be modulated on a carrier wave and output. The control signal may be stored in the memory 250 or may be generated by the control unit. The external apparatus 200 may include an infrared-laser emitting diode (IR-LED).

The memory 250 may store various data, programs, or applications for driving and controlling the external apparatus 200 under the control of the control unit. The memory 250 may store input or output signals or data corresponding to driving of the communicator 210, the optical output unit 240, and the power supply unit 260. The memory 250 may store a control signal corresponding to a user input (e.g., touch, press, touch gesture, voice, or motion) received under the control of the control unit.

The memory 250 may be implemented, for example, and without limitation, as a non-volatile memory, a volatile memory, a flash memory, a hard disk drive (HDD), a solid state drive (SSD), or the like. The memory 250 may be implemented as an external storage medium such as, for example, and without limitation, a micro SD card, a USB memory, a web server over a network, or the like, as well as a storage medium in the electronic apparatus 100.

The power supply 260 may supply power to the internal components 210 to 250 of the external apparatus 200 under the control of the control unit. The power supply 260 may supply power to the internal components 210 to 250 from of, for example, and without limitation, one or more batteries (not shown) located inside the external apparatus 200. The battery may, for example, be located between the key 221 on a surface of the external apparatus 200 and the touch pad 222 and a back cover (not shown).

At least one of the components shown in the external apparatus 200 of FIG. 5 may be added or deleted with respect to the performance of the external apparatus 200. It will be readily understood by those skilled in the art that positions of the components may be changed in correspondence to the performance or structure of the external apparatus 200.

Figure 6:
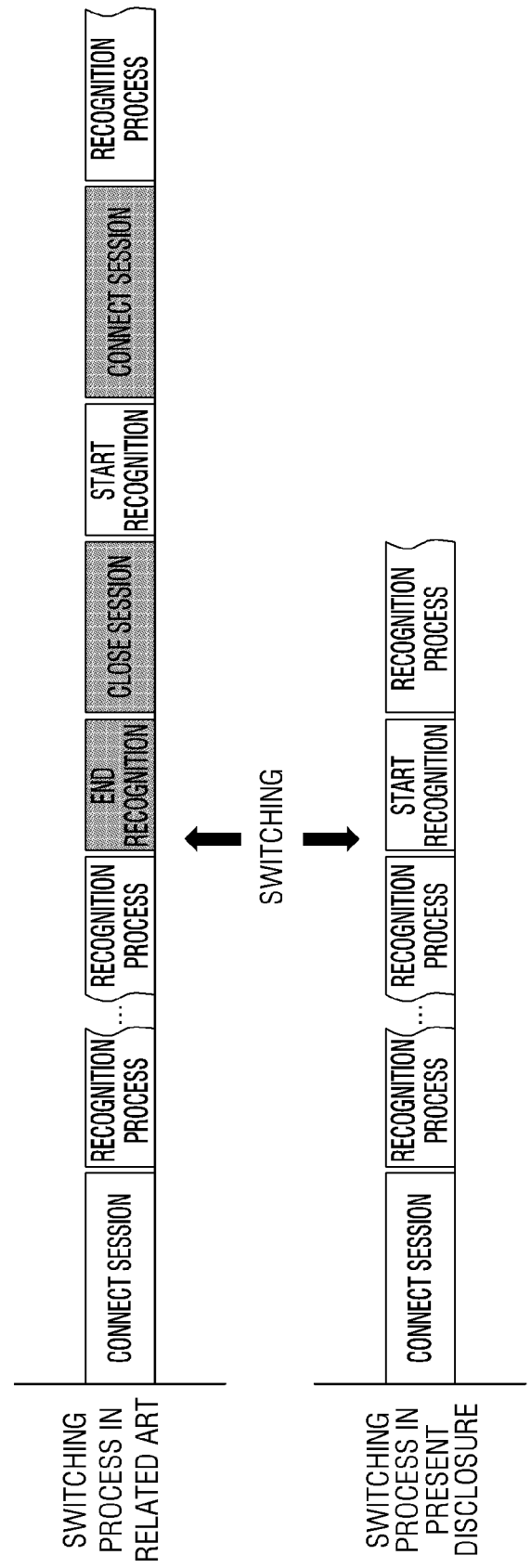
FIG. 6 is a diagram illustrating an example operation of maintaining a session in a switching process.

FIG. 6 is a diagram illustrating an example operation of maintaining a session in a switching process and comparing it with related art that does not maintain a session.

Referring to FIG. 6, a switching process in the related art and a switching process in the present disclosure may be compared.

In the related art, when there is a voice recognition start command from the first external apparatus 200-1, a session with the voice recognition server 300 was established. Then, audio data was received from the first external apparatus 200-1 and a voice recognition process was performed. Here, it is assumed that there is switching in which a voice input start signal is received from the second external apparatus 200-2. In the related art, when there is switching, voice recognition was terminated with respect to the audio data received from the first external apparatus 200-1, and the session with the existing voice recognition server 300 was blocked. Here, blocking the session means that the session is closed (e.g., ended). Then, voice recognition was started with respect to the audio data received from the second external apparatus 200-2, a new session was established with the voice recognition server 300, and the voice recognition process was performed. That is, in the related art, when there is voice recognition switching from the first external apparatus 200-1 to the second external apparatus 200-2, the existing session was blocked and a new session was connected.

On the other hand, the electronic apparatus 100 according to an example embodiment of the present disclosure may maintain an existing session. For example, since the electronic apparatus 100 may maintain the existing session even when there is switching while performing the voice recognition process on the audio data received from the first external apparatus 200-1, the electronic apparatus 100 may continuously perform voice recognition on the audio data received from the second external apparatus 200-2.

Referring to FIG. 6, the electronic apparatus 100 according to an example embodiment of the present disclosure may omit an operation of terminating voice recognition with the first external apparatus 200-1, an operation of blocking the existing session established for processing the audio data received from the first external apparatus 200-1, and an operation of establishing a new session for processing the audio data received from the second external apparatus 200-2, compared to the related art.

Therefore, the electronic apparatus 100 may reduce a processing time of the entire voice recognition process by a time of the omitted operations. As described above, the electronic apparatus 100 according to an example embodiment of the present disclosure may maintain the established session using information on the established session without establishing a new session when there is a switching operation, and thus unnecessary processing time and the traffic for server connection may not be wasted.

FIG. 7 is a diagram illustrating an example switching process according to an example embodiment of the present disclosure.

Referring to FIG. 7, it is assumed that a user performs voice recognition with the first external apparatus 200-1 and then performs voice recognition with the second external apparatus 200-2.

The electronic apparatus 100 needs to determine whether users are the same in order to determine that it is a switching operation. When it is determined that the users are the same, the electronic apparatus 100 may continue to perform voice recognition, and when the users are not the same, the electronic apparatus 100 may separately perform a voice recognition process.

The electronic apparatus 100 may analyze the audio data received from the external apparatus 200 to determine whether the users are the same. Specifically, the electronic apparatus 100 may analyze the audio data received from the first external apparatus 200-1 and the second external apparatus 200-2, respectively, to determine whether the users are the same. The electronic apparatus 100 may use, for example, and without limitatoin, at least one of voice pattern, size, and frequency of people to determine whether the audio data is voice of the same user.

The electronic apparatus 100 may, for example, determine whether the users are the same using ID information of the external apparatus 200. The electronic apparatus 100 may store the ID information of the external apparatus 200 having a history used by the user in the memory 140. The electronic apparatus 100 may determine that the users are the same when switching occurs between the external apparatuses 200 having a history used once. If the external apparatus 200 having no use history is recognized, the electronic apparatus 100 may determine that the users are not the same.

While the electronic apparatus 100 according to an example embodiment of the present disclosure has been described to perform an operation of determining whether the users are the same, the electronic apparatus 100 may not determine whether the users are the same.

Referring to FIG. 7, when the electronic apparatus 100 determines that switching has occurred by the same user, the electronic apparatus 100 may continuously process first audio data "samsung" received from the first external apparatus 200-1 and second audio data "electronics" received from the second external apparatus 200-2 as one voice recognition.

For example, when the electronic apparatus 100 receives the first audio data "samsung" in the first external apparatus 200-1, the electronic apparatus 100 may store the first audio data "samsung" in the memory 140.

The electronic apparatus 100 may transmit the first audio data "samsung" to the voice recognition server 300 before receiving the second audio data "electronics" received from the second external apparatus 200-2. In this case, when receiving the second audio data "electronics", the electronic apparatus 100 may combine and transmit "samsung" and "electronics", other than "electronics", to the voice recognition server 300.

The electronic apparatus 100 may not have transmitted the first audio data "samsung" to the voice recognition server 300 before receiving the second audio data "electronics" received from the second external apparatus 200-2. In this case, the electronic apparatus 100 may store the first audio data "samsung" in the memory 140. When receiving the second audio data "electronics" received from the second external apparatus 200-2, the electronic apparatus 100 may combine and transmit the first audio data "samsung" and the second audio data "electronics" to the voice recognition server 300.

The electronic apparatus 100 may then display a voice recognition process on the display 131 of the electronic apparatus 100.

Although the switching operation has been described as being performed from the first external apparatus 200-1 to the second external apparatus 200-2 in FIG. 7, the switching operation may be performed by an internal apparatus of the electronic apparatus 100, other than an external apparatus.

Since voice recognition is possible through the microphone 160 included in the electronic apparatus 100, a switching operation may be performed between the external apparatus 200 and an internal apparatus.

Figure 8:
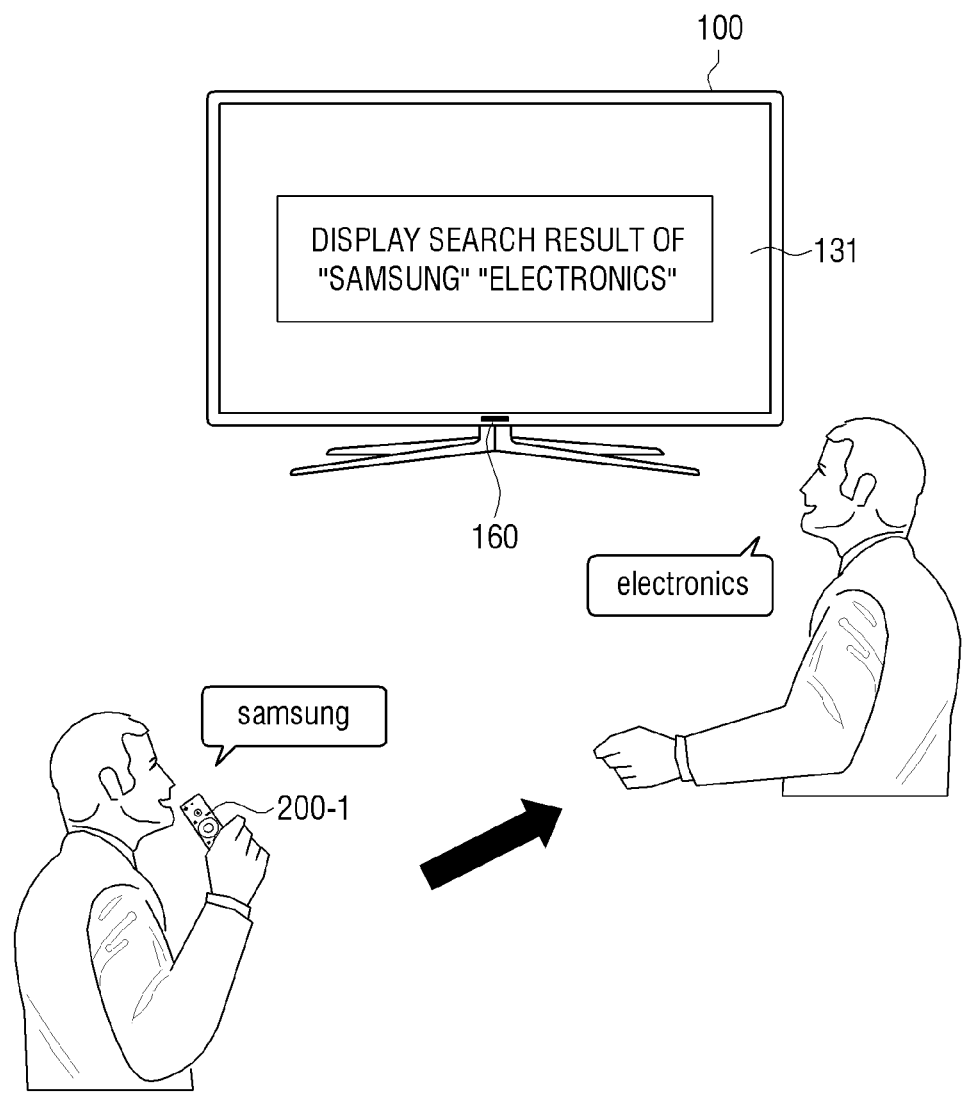
FIG. 8 is a diagram illustrating an example switching process according to another example embodiment of the present disclosure.

FIG. 8 is a diagram illustrating an example switching process according to another example embodiment of the present disclosure.

For example, the first external apparatus 200-1 may receive the first audio data "samsung" and the electronic apparatus 100 that is the internal apparatus may combine and transmit the second audio data "electronics" to the voice recognition server 300. Also, the electronic apparatus 100 may display a voice recognition process on the display 131 of the electronic apparatus 100.

In the description of FIG. 8, an example process of determining the user identity and transmitting audio data to the voice recognition server 300 is not repeated, but the process may be performed as described with reference to FIG. 7 above.

The case where the switching operation is performed from an external apparatus to an internal apparatus has been described, but conversely, the switching operation may be performed by the internal apparatus to the external apparatus.

Figure 9:
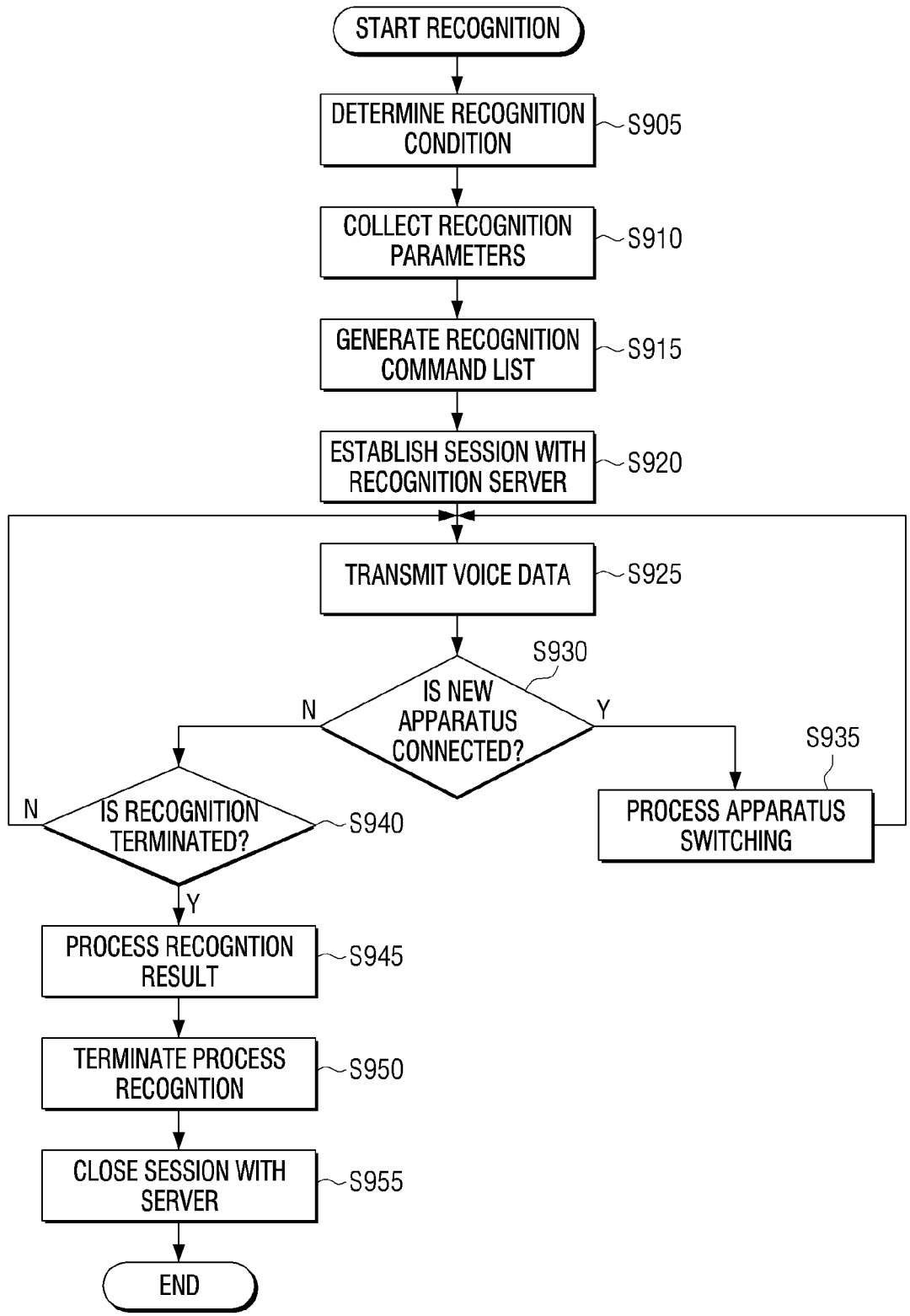
FIG. 9 is a flowchart illustrating an example method of controlling an electronic apparatus according to an example embodiment of the present disclosure.

FIG. 9 is a flowchart illustrating an example method of controlling an electronic apparatus according to an example embodiment of the present disclosure.

Referring to FIG. 9, the electronic apparatus 100 may determine a voice recognition condition (S905).

The electronic apparatus 100 may collect parameters necessary for voice recognition (S910), and generate a recognition command list (S915).

The electronic apparatus 100 may establish a session with the voice recognition server 300 (S920).

The electronic apparatus 100 may receive audio data related to voice recognition of a user and may transmit the audio data to the voice recognition server 300 (S925).

The electronic apparatus 100 may determine whether an apparatus for transmitting the audio data to the electronic apparatus 100 has been changed. That is, the electronic apparatus 10 may determine whether a new apparatus is connected (S930).

If the new apparatus is connected to the electronic apparatus 100, the electronic apparatus 100 may perform an apparatus switching process (S935), and a more detailed description related to the apparatus switching process will be described below with reference to FIG. 10.

The new apparatus may not be connected to the electronic apparatus 100, and the existing apparatus may continue to be connected to the electronic apparatus 100. In this case, the electronic apparatus 100 may determine whether voice recognition is terminated (S940).

If voice recognition is not terminated, the electronic apparatus 100 may continue to transmit the audio data of the user to the voice recognition server 300.

However, when the voice recognition is terminated, the electronic apparatus 100 may stop transmission of voice data and process a voice recognition result (S945). Processing of the voice recognition result may be an operation of receiving a search result of the audio data in the voice recognition server 300 and providing the result to the user. That is, when the electronic apparatus 100 determines that voice recognition is terminated, the electronic apparatus 100 may receive a result of final voice recognition from the voice recognition server 300 and provide the result to the user.

The electronic apparatus 100 may terminate the voice recognition operation (S950) and block (e.g., close) the established session with the voice recognition server 300 (S955).

Figure 10:
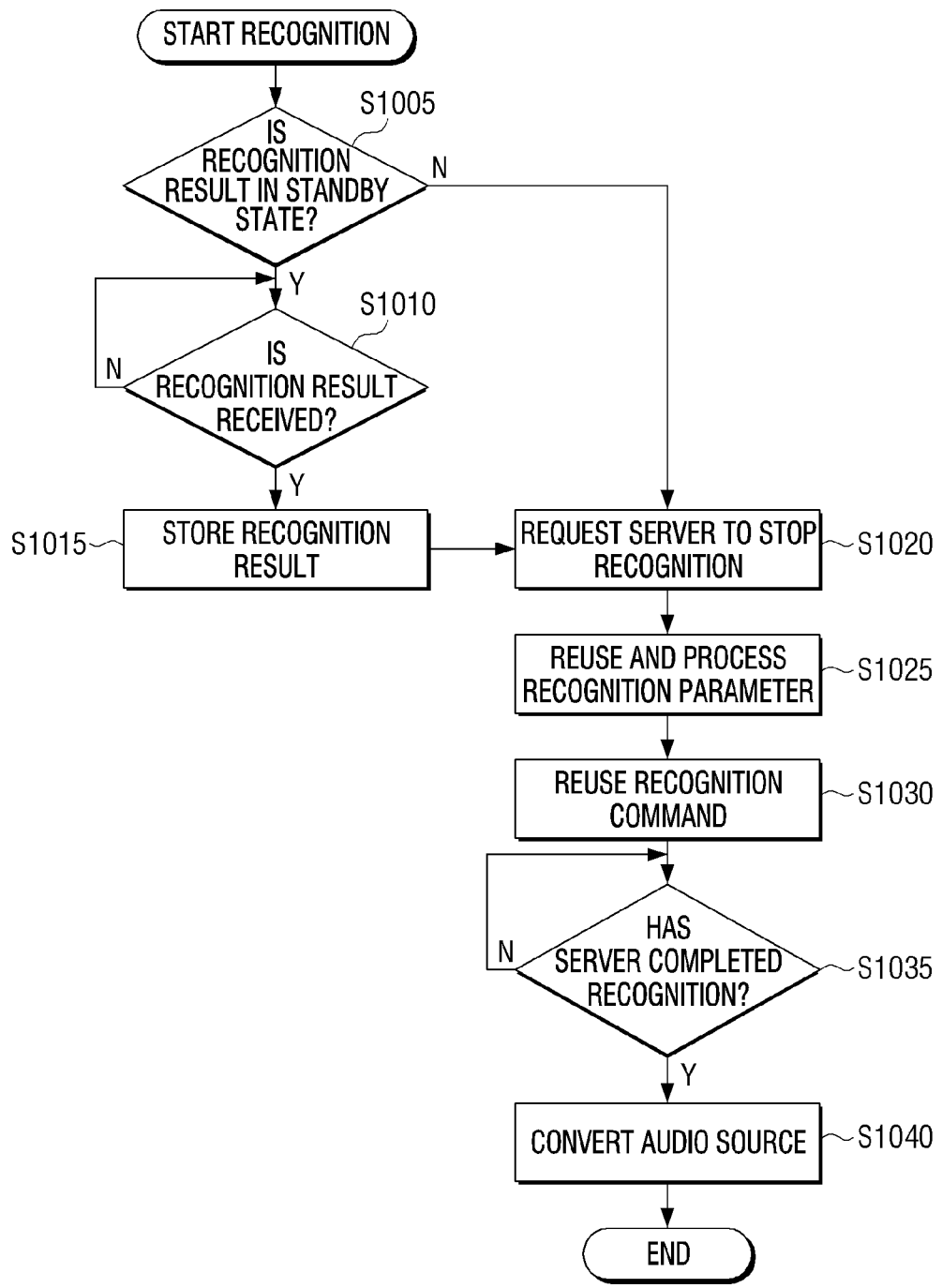
FIG. 10 is a flowchart illustrating an example apparatus switching process according to an example embodiment of the present disclosure.

FIG. 10 is a flowchart illustrating an example apparatus switching process according to an example embodiment of the present disclosure.

Referring to FIG. 10, when the electronic apparatus 100 determines that a new apparatus is connected to the electronic apparatus 100, the electronic apparatus 100 may determine whether the apparatus is in a standby state to receive a voice recognition result (S1005).

Here, when the apparatus is not in the standby state to receive the voice recognition result, the electronic apparatus 100 may immediately request the voice recognition server 300 to stop voice recognition (S1020).

Here, when the voice recognition result is not received, the electronic apparatus 100 may determine whether the voice recognition result is received (S1010), waits until the voice recognition result is received, and when the voice recognition result is received, may store the voice recognition result in the memory 140 (S1015). Then, the electronic apparatus 100 may request the voice recognition server 300 to stop voice recognition immediately (S1020).

The electronic apparatus 100 may reuse voice recognition parameters used in an existing established session and change or process some parameters to use them (S1025). In this case, the processed parameters may be a current time or ID information of the apparatus. Also, the electronic apparatus 100 may reuse a recognition command used in the existing established session (S1030). The electronic apparatus 100 may maintain information about the existing session as it is, and thus stability of the session may be ensured.

The electronic apparatus 100 may determine whether the voice recognition server 300 has completed voice recognition (S1035). When the voice recognition server 300 stops voice recognition, the electronic apparatus 100 may perform an audio source conversion operation (S1040). The audio source conversion operation may be for receiving audio data, which may be an operation of changing conditions for software or controlling hardware such as a microphone.

FIG. 11 is a flowchart illustrating an example method of controlling electronic apparatus control method according to an example embodiment of the present disclosure.

Referring to FIG. 11, the control method of the electronic apparatus 100 according to an example embodiment of the present disclosure may include a step of receiving a voice input start signal from the first external apparatus 200-1 (S1105), and a step of establishing a session with the voice recognition server 300 (S1110).

The step of establishing the session with the voice recognition server 300 may include establishing the session using information about voice recognition of the electronic apparatus 100, and a step of maintaining the established session may include maintaining the information about voice recognition when a voice input start signal is received from the second external apparatus 200-2 and maintaining the established session.

The information about voice recognition may include at least one of usage terms and conditions, account information, a network status, a voice recognition parameter, and a voice recognition command list.

Here, the voice recognition parameter may include at least one of currently input source information and an apparatus status.

Also, the voice recognition command list may include at least one of application information used in the electronic apparatus 100, EPG data of a currently input source, and commands for functions provided by the electronic apparatus 100.

The control method of the electronic apparatus 100 may further include a step (S1115) of receiving the voice input start signal from the second external apparatus 200-2 in a state where the session is established, a step (S1120) of maintaining the established session, and a step (S1125) of processing voice recognition of audio data received from the second external apparatus 200-2 using the maintained session.

The method may further include determining whether to maintain the established session before maintaining the established session, and determining whether the user of the first external apparatus 200-1 and the user of the second external apparatus 200-2 are the same user, when the user of the first external apparatus 200-1 and the user of the second external apparatus 200-2 are the same user, maintaining the established session, and when the user of the first external apparatus 200-1 and the user of the second external apparatus 200-2 are not the same user, blocking the established session and establishing a new session.

The step of determining whether to maintain the established session may include determining whether the user of the first external apparatus 200-1 and the user of the second external apparatus 200-2 are the same user by comparing voice of first audio data received from the first external apparatus 200-1 with voice of second audio data received from the second external apparatus 200-2.

Also, the step of determining whether to maintain the established session may include determining whether the user of the first external apparatus 200-1 and the user of the second external apparatus 200-2 are the same user by comparing ID information of the first external apparatus 200-1 with ID information of the second external apparatus 200-2.

The control method of the electronic apparatus 100 may include steps of storing the first audio data received from the first external apparatus 200-1, transmitting the first audio data to the voice recognition server 300 using the established session and combining and transmitting the second audio data received from the second external apparatus 200-2 with the stored first audio data to the voice recognition server 300.

The control method of the electronic apparatus 100 may further include a step of displaying information about a progress of voice recognition when a voice input start signal is received from the first external apparatus 200-1.

As described above, the control method of the electronic apparatus 100 according to an example embodiment of the present disclosure may maintain an established session using information about an existing established session without establishing a new session when there is a switching operation, and thus unnecessary processing time and traffic for server connection may not be wasted.

The various embodiments described above may be implemented in a recording medium which may be read by a computer or a similar apparatus using software, hardware, or a combination thereof. According to a hardware implementation, the embodiments described in the present disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, an electrical unit for performing other functions, or the like. In some cases, the various example embodiments described herein may be implemented by the processor 120 itself. According to a software implementation, embodiments such as the procedures and functions described herein may be implemented in separate software modules. Each of the software modules may perform one or more of the functions and operations described herein.

Meanwhile, computer instructions for performing processing operations of the electronic apparatus 100 according to the various embodiments described above may be stored in a non-transitory computer-readable recording medium. The computer instructions stored in the non-transitory computer-readable medium may cause a specific device to perform the processing operations of the electronic apparatus 100 according to the various embodiments described above when executed by a processor of the specific device.

The non-transitory computer-readable medium is a medium that semi-permanently stores data and is readable by a device. Non-limiting examples of the non-transitory computer-readable medium include CD, DVD, hard disk, Blu-ray disk, USB, memory card, ROM, and the like.

Although various example embodiments of the present disclosure have been illustrated and described hereinabove, the present disclosure is not limited to the abovementioned example embodiments, but may be variously modified by those skilled in the art to which the present disclosure pertains without departing from the scope and spirit of the present disclosure as described, for example, in the accompanying claims. These modifications should also be understood to fall within the scope of the present disclosure.

What is claimed is:

1. An electronic apparatus comprising:
a communicator comprising communication circuitry configured to communicate with a voice recognition server; and
a processor configured to:
control the communicator to receive a broadcast signal from an external source for output by the electronic apparatus,
control the communicator to establish a session via account information and a voice recognition parameter with the voice recognition server, based on a first audio data received from a first remote controller configured to control operation of the electronic apparatus,
identify whether a user of the first remote controller and a user of a second remote controller, configured to control operation of the electronic apparatus, are a same user by comparing the first audio data received from the first remote controller with a second audio data received from the second remote controller, based on receiving the second audio data from the second remote controller in a state where the session is established,
wherein the voice recognition parameter includes source information identifying a source of the broadcast signal received by the electronic apparatus and a state of the electronic apparatus.

2. The electronic apparatus as claimed in claim 1, wherein the processor is configured to identify whether the user of the first remote controller and the user of the second remote controller are the same user by comparing ID information of the first remote controller with ID information of the second remote controller.

3. The electronic apparatus as claimed in claim 1, wherein the processor is configured to establish a session using information about voice recognition of the electronic apparatus,
to maintain the information about voice recognition and maintain the established session based on the second audio data being received from the second remote controller.

4. The electronic apparatus as claimed in claim 3, wherein the information about voice recognition includes at least one of: usage terms and conditions, the voice recognition parameter, and a network status.

5. The electronic apparatus as claimed in claim 1, wherein the voice recognition parameter includes at least one of: application information used in the electronic apparatus, and EPG data of the broadcast signal.

6. The electronic apparatus as claimed in claim 1, further comprising a memory configured to store the first audio data received from the first remote controller,
wherein the processor is configured to transmit the first audio data to the voice recognition server using the established session, and to combine the second audio data received from the second remote controller with the stored first audio data and to transmit the combined audio data to the voice recognition server.

7. The electronic apparatus as claimed in claim 1, further comprising a display,
wherein the processor is configured to control the display to display information about a progress of voice recognition based on the first audio data being received from the first remote controller.

8. The electronic apparatus as claimed in claim 1, wherein the apparatus is further configured so that:
a user utters a spoken command to the first remote controller followed by the second remote controller;
the spoken command corresponds to the first audio data received from the first remote controller and the second audio data received from the second remote controller;
the electronic apparatus further comprising a memory configured to store the first audio data received from the first remote controller; and
the processor is configured to transmit the first audio data to the voice recognition server using the established session, combine the second audio data received from the second remote controller with the stored first audio data, and transmit the combined audio data to the voice recognition server.

9. The electronic apparatus as claimed in claim 1, wherein the processor is configured to:
based on the user of the first remote controller and the user of the second remote controller being the same user, maintain the established session,
combine the second audio data with the first audio data,
control the communicator to transmit the combined audio data to the voice recognition server re-using the account information and the voice recognition parameter of the maintained session, and
control the communicator to receive a first result data corresponding to the combined audio data from the voice recognition server re-using the maintained session.

10. The electronic apparatus as claimed in claim 1, wherein the processor is configured to:
based on the user of the first remote controller and the user of the second remote controller being not the same user, block the established session and establish a new session,
transmit the second audio data to the voice recognition server using the established new session with the voice recognition server, and
control the communicator to receive a second result data corresponding to the second audio data from the voice recognition server.

11. A method of controlling an electronic apparatus, the method comprising:
receiving a broadcast signal from an external source for output by the electronic apparatus;
receiving a first audio data from a first remote controller configured to control operation of the electronic apparatus;
establishing a session using account information and a voice recognition parameter with voice recognition server based on the first audio data;
identifying whether a user of the first remote controller and a user of a second remote controller, configured to control operation of the electronic apparatus, are a same user by comparing the first audio data received from the first remote controller with a second audio data received from the second remote controller, based on receiving the second audio data from the second remote controller in a state where the session is established;
based on the user of the first remote controller and the user of the second remote controller being the same user:
maintaining the established session,
combining the second audio data with the first audio data,
transmitting the combined audio data to the voice recognition server re-using the account information and the voice recognition parameter of the maintained session, and
receiving a first result data corresponding to the transmitted the combined audio data from the voice recognition server re-using the maintained session, and
based on the user of the first remote controller and the user of the second remote controller being not the same user:
blocking the established session and establish a new session,
transmitting the second audio data to the voice recognition server using the established new session with the voice recognition server, and
receiving a second result data corresponding to the second audio data from the voice recognition server,
wherein the voice recognition parameter includes source information identifying a source of the broadcast signal being received by the electronic apparatus and a state of the electronic apparatus.

12. The method as claimed in claim 11, wherein the identifying of whether to maintain the established session includes identifying whether the user of the first remote controller and the user of the second remote controller are the same user by comparing ID information of the first remote controller with ID information of the second remote controller.

13. The method as claimed in claim 11,
wherein the establishing of the session with the voice recognition server includes establishing a session using information about voice recognition of the electronic apparatus, and
wherein the maintaining of the established session includes maintaining the information about voice recognition, based on the second audio data being received from the second remote controller, and maintaining the established session.

14. The method as claimed in claim 13, wherein the information about voice recognition includes at least one of: usage terms and conditions, account information, a network status and the voice recognition parameter.

15. The method as claimed in claim 11, wherein the voice recognition parameter includes at least one of: application information used in the electronic apparatus, and EPG data of the broadcast signal.

16. The method as claimed in claim 11, further comprising:
storing the first audio data received from the first remote controller;
transmitting the first audio data to the voice recognition server using the established session;
combining the second audio data received from the second remote controller with the stored first audio data; and
transmitting the combined audio data to the voice recognition server.

17. The method as claimed in claim 11, further comprising: displaying information about a progress of voice recognition based on the first audio data being received from the first remote controller.

18. The method as claimed in claim 11, further comprising:
based on the user of the first remote controller and the user of the second remote controller being the same user,
maintaining the established session,
combining the second audio data with the first audio data,
transmitting the combined audio data to the voice recognition server re-using the account information and the voice recognition parameter of the maintained session; and
receiving a first result data corresponding to the transmitted the combined audio data from the voice recognition server re-using the maintained session.

19. The method as claimed in claim 11, further comprising:
based on the user of the first remote controller and the user of the second remote controller being not the same user,
blocking the established session and establish a new session,
transmitting the second audio data to the voice recognition server using the established new session with the voice recognition server, and
receiving a second result data corresponding to the second audio data from the voice recognition server.

20. An electronic apparatus comprising:
a display;
a communicator comprising communication circuitry configured to communicate with a voice recognition server; and
a processor configured to:
control the communicator to receive a broadcast signal from an external source for display on the display by the electronic apparatus;
control the communicator to receive a first voice input start signal and first audio data from a first remote controller configured to control operation of the electronic apparatus;
control the communicator to establish a session via a voice recognition parameter with the voice recognition server, based on the first voice input start signal received from the first remote controller;
store the first audio data received from the first remote controller;
transmit the first audio data to the voice recognition server using the established session;
after establishing the session with the voice recognition server, control the communicator to receive a second voice input start signal and second audio data from a second remote controller configured to control operation of the electronic apparatus, while the established session with the voice recognition server is maintained;
determine whether a user of the first remote controller and a user of the second remote controller are a same user by comparing the first voice input start signal received from the first remote controller with the second voice input start signal received from the second remote controller;
based on the user of the first remote controller and the user of the second remote controller being the same user, maintain the established session with the voice recognition server, combine the second audio data with the stored first audio data, transmit the combined audio data to the voice recognition server using the maintained session with the voice recognition server, and control the communicator to receive a first result data corresponding to the combined audio data from the voice recognition server re-using the voice recognition parameter of the maintained session; and
based on the user of the first remote controller and the user of the second remote controller not being the same user, block the established session, establishing a new session with the voice recognition server, transmit the second audio data to the voice recognition server using the established new session with the voice recognition server, and control the communicator to receive a second result data corresponding to the second audio data from the voice recognition server,
wherein the voice recognition parameter includes source information identifying a source of the broadcast signal being received by the electronic apparatus and a state of the electronic apparatus.

* * * * *